United States Patent
Zhang et al.

(10) Patent No.: US 9,355,679 B1
(45) Date of Patent: May 31, 2016

(54) TRANSDUCER WRITE FIELD CURVATURE CHARACTERIZATION AND COMPENSATION

(71) Applicant: Seagate Technology LLC, Cupertino, CA (US)

(72) Inventors: Huaan Zhang, Sunnyvale, CA (US); Barmeshwar Vikramaditya, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/076,155

(22) Filed: Nov. 8, 2013

(51) Int. Cl.
- G11B 5/09 (2006.01)
- G11B 20/10 (2006.01)
- G11B 27/36 (2006.01)
- G11B 19/04 (2006.01)
- G11B 5/596 (2006.01)

(52) U.S. Cl.
CPC ...... *G11B 20/10398* (2013.01); *G11B 5/59627* (2013.01); *G11B 19/041* (2013.01); *G11B 19/045* (2013.01); *G11B 20/10009* (2013.01); *G11B 20/1024* (2013.01); *G11B 20/10212* (2013.01); *G11B 20/10222* (2013.01); *G11B 27/36* (2013.01)

(58) Field of Classification Search
None
See application file for complete search history.

(56) References Cited

U.S. PATENT DOCUMENTS

| | | | |
|---|---|---|---|
| 4,616,282 A | 10/1986 | Sastra | |
| 5,488,520 A | 1/1996 | Aizawa et al. | |
| 5,552,944 A | 9/1996 | Clemow | |
| 5,572,269 A | 11/1996 | Brock | |
| 5,710,673 A | 1/1998 | Varian | |
| 5,757,575 A | 5/1998 | Hallamasek | |
| 5,835,295 A * | 11/1998 | Behrens | G11B 20/10009 360/51 |
| 6,940,671 B2 * | 9/2005 | Seng | G11B 20/10009 360/31 |
| 7,170,700 B1 * | 1/2007 | Lin et al. | 360/31 |
| 7,362,536 B1 * | 4/2008 | Liu | G11B 5/5556 360/75 |
| 7,748,103 B2 | 7/2010 | Allen | |
| 7,826,169 B2 | 11/2010 | Saliba | |
| 7,848,048 B1 * | 12/2010 | Albrecht et al. | 360/75 |
| 8,169,735 B1 * | 5/2012 | Sutardja et al. | 360/75 |
| 8,355,298 B2 | 1/2013 | Sasaki | |
| 8,432,638 B2 | 4/2013 | Sechi | |
| 8,508,878 B1 * | 8/2013 | Zou | G11B 5/59616 360/48 |
| 8,638,513 B1 * | 1/2014 | Burd | G11B 5/012 360/39 |
| 8,687,304 B1 * | 4/2014 | Zou et al. | 360/51 |

(Continued)

OTHER PUBLICATIONS

Heijden, Effects of transition curvature on perpendicular magnetic recording performance, Applied Physics Letters, May 2003, vol. 83, Issue 21, Pittsburgh, Pennsylvania http://apl.aip.org/resource/1/applab/v83/i21/p4369_s1?isAuthorized=no.

(Continued)

*Primary Examiner* — Dismery Mercedes
(74) *Attorney, Agent, or Firm* — Cesari & Reed, LLP; Kirk A. Cesari

(57) ABSTRACT

The disclosure is related to apparatuses and methods for characterizing and compensating for curvature in a write field generated by a data storage device transducer. In some embodiments, the curvature of a write field generated by a data storage device transducer may be characterized. Some embodiments can include a circuit to apply a phase compensation value based on a deterministic phase offset value, which may correspond with the write field curvature characterization.

18 Claims, 11 Drawing Sheets

(56) References Cited

U.S. PATENT DOCUMENTS

| | | | |
|---|---|---|---|
| 2010/0118426 A1* | 5/2010 | Vikramaditya | B82Y 10/00 360/51 |
| 2010/0157749 A1* | 6/2010 | Ogawa | G11B 7/094 369/44.1 |
| 2010/0202079 A1* | 8/2010 | Buch et al. | 360/51 |
| 2010/0277827 A1* | 11/2010 | Wood et al. | 360/75 |
| 2011/0102942 A1* | 5/2011 | Bai et al. | 360/125.03 |
| 2011/0286125 A1* | 11/2011 | Lille | B82Y 10/00 360/31 |
| 2012/0105994 A1* | 5/2012 | Bellorado | G11B 5/012 360/45 |
| 2013/0141811 A1* | 6/2013 | Hirano et al. | 360/51 |
| 2013/0163111 A1* | 6/2013 | Albrecht | G11B 5/012 360/75 |
| 2013/0250447 A1* | 9/2013 | Erden | 360/51 |
| 2014/0139940 A1* | 5/2014 | Ong et al. | 360/39 |
| 2015/0116860 A1* | 4/2015 | Coker | G11B 20/10046 360/65 |

OTHER PUBLICATIONS

Liu, Quantitative analysis of transition curvature by magnetic force microscopy, Journal of Applied Physics, 2002, vol. 91, Issue 10, Bloomington, Minnesota http://jap.aip.org/resource/1/japiau/v91/i10/p6842_s1?isAuthorized=no.

Hashimoto, Analysis of Written Transition Curvature in Perpendicular Magnetic Recording From Spin-Stand Testing, Magnetics, IEEE Transactions on , vol. 43, No. 7, pp. 3315,3319, Jul. 2007 http//ieeexplore.ieee.org/xpl/login.jsp?tp=&arnumber=4252291&url=http%3A%2F%2Fieeexplore.ieee.org%2Fiel5%2F20%2F4252275%2F04252291.pdf%3Farnumber%3D4252291.

Shiimoto, Effect of Transition Curvature and Track Edge Fluctuation on Track Edge Noise for Narrow Track Recording, IEEE Transactions on Magnetics, vol. 46, No. 6, Jun. 2010, Japan http://www.umc.edu.dz/vf/images/ieee-magnetique/jpdfs/ieee/mag/tmag/2010046/06jun/1428shii.pdf.

\* cited by examiner

TRANSDUCER WRITE FIELD CURVATURE CHARACTERIZATION AND COMPENSATION

Certain embodiments of the present disclosure provide an apparatus including a circuit configured to apply a phase compensation value to a write signal when writing data to a data track.

Further, some embodiments provide an apparatus including a compensation module configured to apply a phase compensation value to a write signal when writing data to a data track. The phase compensation value can be determined based on a characterization of curvature in a write field generated by a transducer.

Even further, some embodiments provide a method including characterizing curvature of a write field generated by a transducer when writing data to a data track.

DETAILED DESCRIPTION

In the following detailed description of the embodiments, reference is made to the accompanying drawings, which form a part hereof, and in which are shown by way of illustration of specific embodiments. It is to be understood that features of the various described embodiments may be combined, other embodiments may be utilized, and structural changes may be made without departing from the scope of the present disclosure.

Data storage devices (DSDs), such as disc drives or hybrid drives, can include a recording head (or transducer) with a write element that generates a magnetic field while writing data to a storage medium, such as a magnetic disc. Curvature in the write field can cause a deterministic incoherency between data patterns written to adjacent data tracks of the storage medium that may negatively affect the DSD in various ways. Solutions to this and other problems are disclosed herein.

Figure 1:
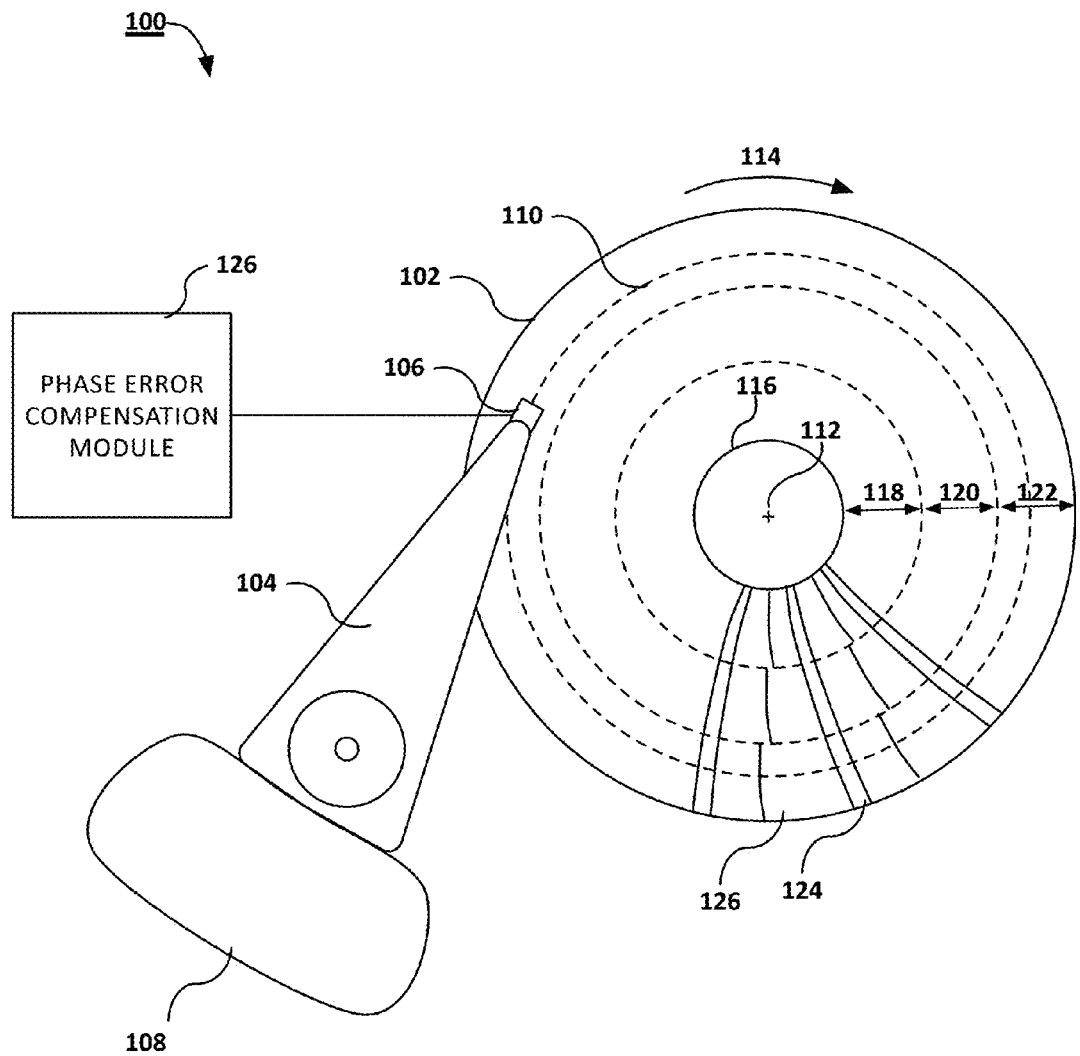
FIG. 1 is a diagram of a data storage device (DSD) with a system for transducer write field curvature characterization and compensation, in accordance with certain embodiments of the present disclosure.

FIG. 1 is a diagram of a disc drive 100, in accordance with certain embodiments of the present disclosure. The disc drive 100 can include a disc 102, an arm 104, a recording head 106, and an actuator 108. Although FIG. 1 depicts a single disc 102, it should be understood that multiple discs may be mounted on the spindle 116, and one or more arm 104/recording head 106 assemblies may be disposed above and below each of the discs. A motor (not shown) connected to the spindle 116 can drive the rotation of the disc 102 about central axis 112 in a clockwise direction 114 or in a counter-clockwise direction (not shown).

The disc 102 may comprise, for example, a magnetic recording layer deposited on a substrate. The disc 102 may also contain other magnetic or non-magnetic layers, such as a soft magnetic underlayer, which is not explicitly shown. The recording layer may be fabricated using various ferromagnetic materials and alloys suitable for storing magnetic information and may be deposited on the substrate using a variety of deposition techniques. The substrate may be constructed from various materials, such as glass or aluminum-magnesium alloy.

Further, the disc 102 can comprise a plurality of substantially concentric circular tracks 110. The tracks 110 may be grouped into one or more zones, such as radially innermost data zone 118, radially intermediate zone 120, and radially outermost zone 122. A system information region and a diagnostics and guard region may lie near the inner diameter (ID) and/or outer diameter (OD) of the disc 102, outside the data storage area. The disc drive 100 may implement a two-dimensional magnetic recording (TDMR) storage architecture, a heat-assisted magnetic recording (HAMR) storage architecture, or a shingled magnetic recording (SMR) storage architecture, all of which may be combined with the embodiments of write field curvature characterization and compensation disclosed herein.

The disc drive 100 may also have a series of radially extending servo sectors 124 (also known as servo fields or servo wedges). The radial servo sectors 124 may be equally spaced around the circumference of the disc 102. While the number of data sectors 126 in each zone may vary, the number of embedded servo wedges 124 can remain invariant throughout the extent of the storage surface. Each data sector 126 can be of fixed storage capacity or length (e.g., 512 bytes of user data per data sector 126), and since the density and data rates may vary from data zone to data zone, the servo sectors 124 may interrupt and split up at least some of the data sectors 126 or fields. The servo sectors 124 can be recorded with a servo writing apparatus at the factory, but may be written (or partially written) by a self-servo writing operation.

When writing data to the disc 102, the actuator 108 rotates the arm 104 and positions the recording head 106 at the desired write location. Each servo sector 124 includes positioning information that is stored onto each respective servo sector 124 such that the recording head 106 can easily locate data.

In some embodiments, the disc drive 100 may also include a phase error compensation module 126 configured to compensate for an apparent track-to-track phase error induced by curvature present in the write field of the recording head 106.

Figure 2:
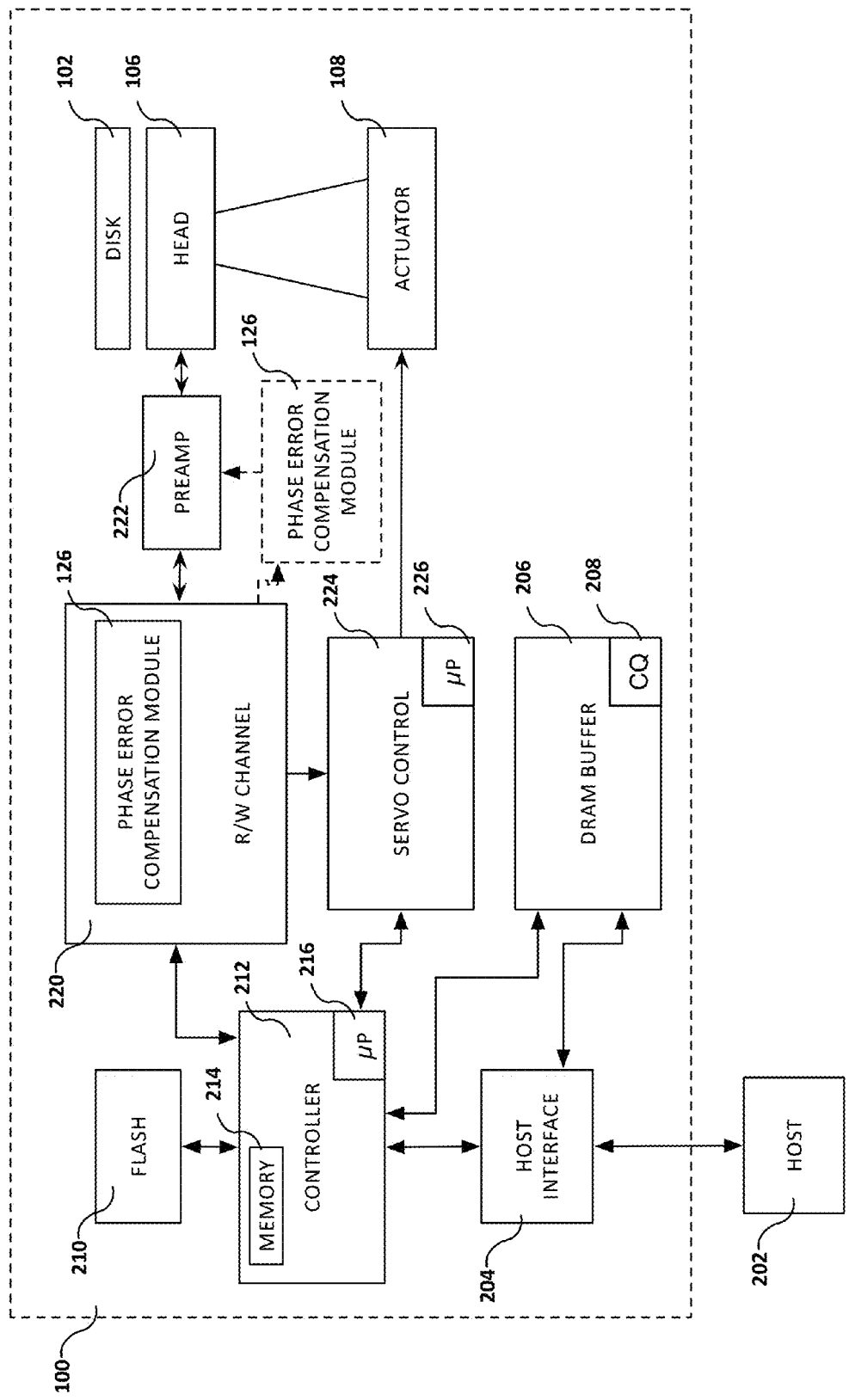
FIG. 2 is a functional block diagram of a DSD with a system for transducer write field curvature characterization and compensation, in accordance with certain embodiments of the present disclosure.

FIG. 2 provides a functional block diagram of a data storage device, such as the disc drive 100 shown in FIG. 1, in accordance with certain embodiments of the present disclosure. The disc drive 100 can communicate with a host device 202 via a hardware/firmware based host interface circuit 204 that may include a connector (not shown) that allows the disc drive 100 to be physically removed from the host 202. The buffer 206 can temporarily store user data during read and write operations and can include a command queue (CQ) 208 where multiple pending access operations can be temporarily stored pending execution. A nonvolatile solid-state memory, such as Flash memory 210, can be included for additional cache or buffer memory, or to provide additional addressable data storage for the disc drive 100. The disc drive 100 can include a programmable controller 212 with associated memory 214 and processor 216.

Further, FIG. 2 shows the disc drive 100 can include a read/write (R/W) channel 220, which can encode data during write operations and reconstruct user data retrieved from disc(s) 102 during read operations. In some embodiments, the R/W channel 220 circuitry can include the phase error compensation module 126. In certain embodiments, the phase error compensation module 126 may reside outside of the R/W channel 220, such as, for example, as a circuit acting as a signal intermediary between the R/W channel 220 and a preamplifier/driver circuit (preamp) 222 or can be incorporated into the preamplifier circuitry. Additionally or alternatively, the phase error compensation module 126 may reside in the memory 214 of controller 212 as a software module comprising a set of instructions that the controller 212 may execute to provide a modified signal to the R/W channel 220. The phase error compensation module 126 may be configured to compensate for an apparent track-to-track phase error induced by curvature present in the write field of the recording head 106

The preamp 222 can apply write currents to the head(s) 106 and provides pre-amplification of readback signals. A servo control circuit 224 may use servo data to provide the appropriate current to the actuator 108 to position the head(s) 106 over the disc(s) 102. The controller 212 can communicate with a processor 226 of the servo control circuit 224 to move the head(s) 106 to the desired locations on the disc(s) 102 during execution of various pending commands in the command queue 208.

Figure 3:
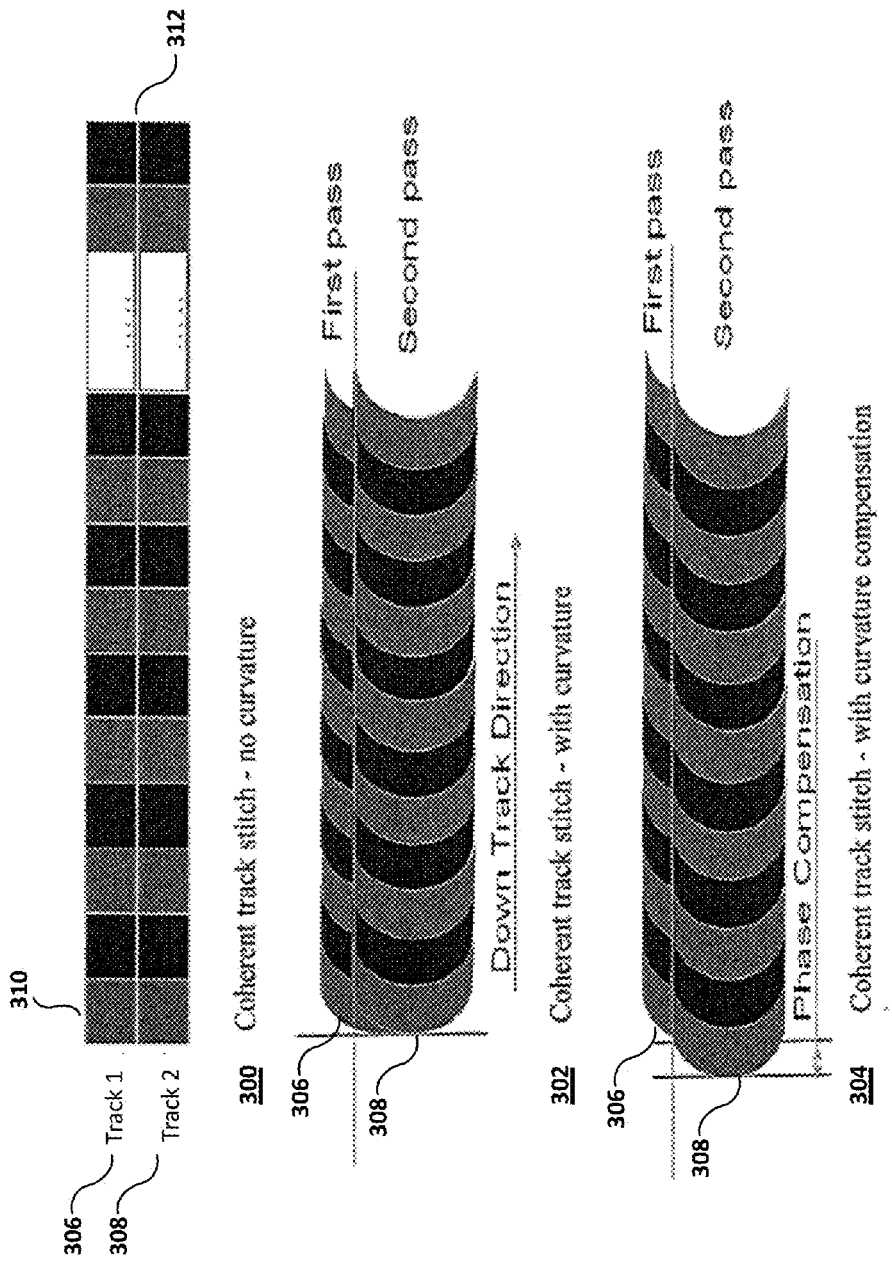
FIG. 3 is a diagram of two adjacent tracks of a data storage medium in various configurations without and with write field curvature characterization and compensation, in accordance with certain embodiments of the present disclosure.

FIG. 3 is a diagram of two adjacent tracks of a data storage medium in various configurations, in accordance with certain embodiments of the present disclosure. Specifically, FIG. 3 shows neighboring (immediately adjacent) tracks 306 and 308 coherently stitched together in three configurations: (1) no-curvature configuration 300; (2) curvature-with-phase-error configuration 302; and (3) curvature-with-compensation configuration 304. Each configuration 300, 302, 304 comprises a first track 306 and a second track 308. Further, the tracks 306 and 308 may be subdivided, for example, into magnetic regions 310 that each represents a single binary unit of information (i.e., a bit).

The no-curvature configuration 300 illustrates coherent stitching of the first track 306 and the second track 308 without curvature present in the write field produced by the recording head 106. Because there is no curvature in the write field, the bits 310 of the two stitched tracks 306, 308 are well aligned at the stitch seam 312.

If, on the other hand, curvature is present in the write field generated by the recording head 106, then the coherent stitching of the first track 306 and the second track 308 will more accurately be reflected by the curvature-with-phase-error 302. The curvature of the write field is indicated in the shape of the bits 310, which, in FIG. 3, is depicted as being curved towards the up-track direction (opposite the down-track direction). This curvature induces a phase offset (also referred to herein as a "phase error") of the second track 308 relative to the first track 306, and vice-versa. Due to the phase error, the bits 310 of the tracks 306 and 308 are not well aligned at the stitch seam 312.

Phase error between the tracks 306 and 308 may negatively impact the disc drive 100 in several ways. For example, in the context of writing user data, the track-to-track phase error reduces the readback signal-to-noise ratio (SNR) and limits the recording density. In the context of conducting a media flaw scan, the track-to-track phase error increases the noise at the stitch seam 312, thereby creating false defects and limiting the effectiveness of the media flaw scan. Further, in the context of servo track writing (STW), the apparent track-to-track phase error reduces the servo pattern quality, and limits the servo pattern linear density. When writing in the direction of inner diameter (ID) to outer diameter (OD) of the disc 102, the impact of the phase error can be worse at the OD.

The curvature-with-compensation configuration 304 illustrates how a phase delay (a phase offset in the down-track direction) or a phase advance (a phase offset in the up-track direction) of the second track 308 relative to the first track 306 can compensate for the phase error (the incoherency between data patterns written to adjacent data tracks). Compared to the curvature-with-phase-error configuration 302, the curvature-with-compensation configuration 304 shows the bits 310 of the second track 306 shifted by a phase advance in the up-track direction, thereby compensating for the apparent phase error. As a result of the phase error compensation, the bits 310 are well aligned at the stitch seam 312. That is, a bit area can be substantially aligned with the corresponding bit area of the immediately adjacent track. A stitch seam 312 having well-aligned bits 310 (as in the curvature-with-compensation configuration 304) can result in a higher SNR than a stitch seam 312 having misaligned bits 310 (as in the curvature-with-phase-error configuration 302).

Figure 4:
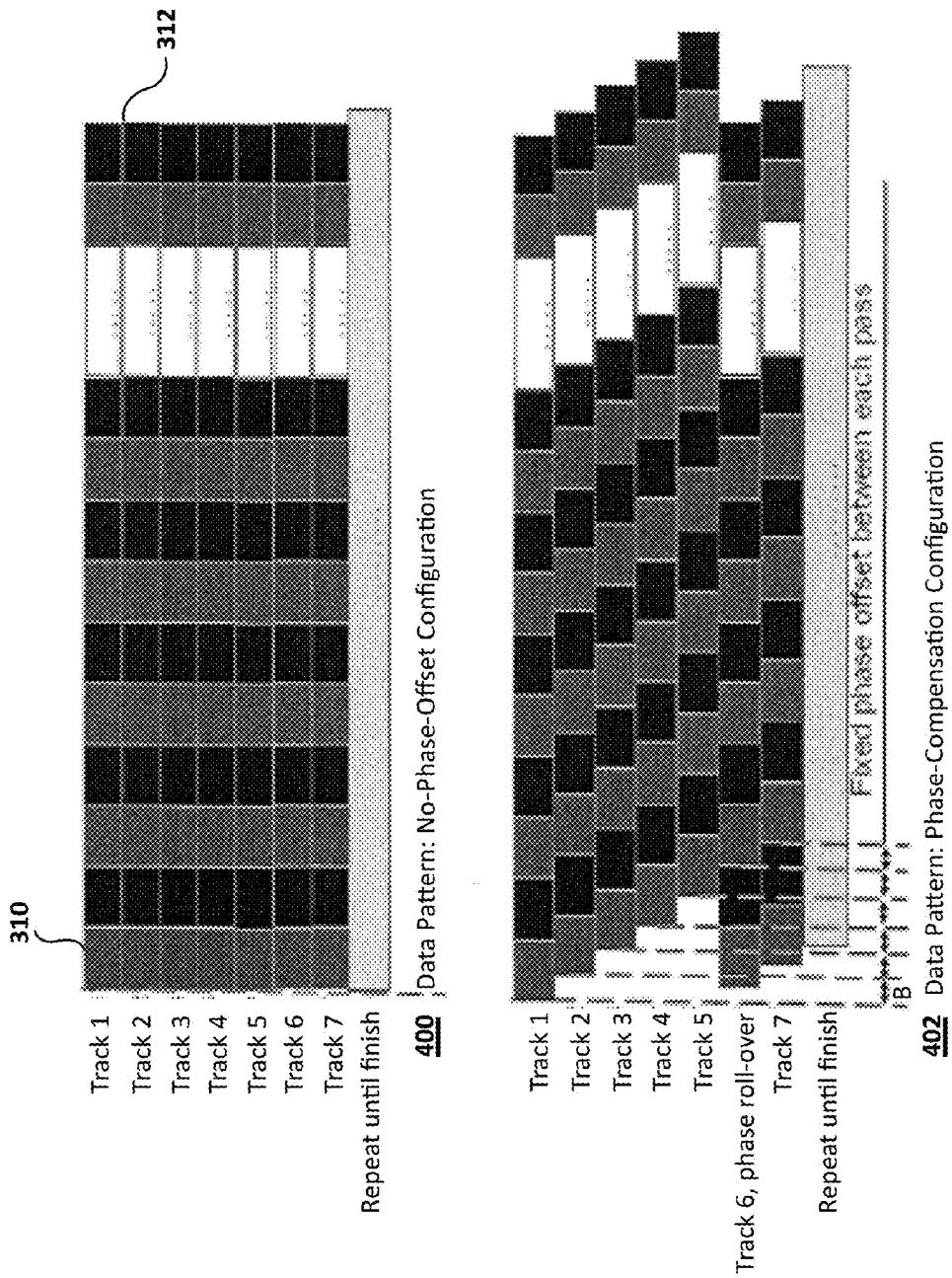
FIG. 4 is a diagram of several adjacent tracks coherently stitched with an implemented phase compensation based on a write field curvature characterization, in accordance with certain embodiments of the present disclosure.

FIG. 4 is a diagram of several adjacent tracks stitched without (400) and with (402) an implemented compensation phase offset, respectively, in accordance with certain embodiments of the present disclosure. The no-phase-offset configuration 400 can have multiple stitch seams 312. Rather than representing tracks written without curvature present in the write field (as in no-curvature configuration 300), the no-phase-offset configuration 400 represents data patterns written to adjacently stitched tracks to which phase error compensation may yet to be applied, a baseline for comparison with the phase-compensation configuration 402.

The phase-compensation configuration 402 can have a phase offset between each track. For example, Track 2 can be shifted (or offset) by a deterministic phase offset B relative to the Track 1, Track 3 can be shifted by the deterministic phase offset B relative to Track 2, and so on, maintaining this phase offset pattern of shifting track n+1 relative to track n.

Figure 5:
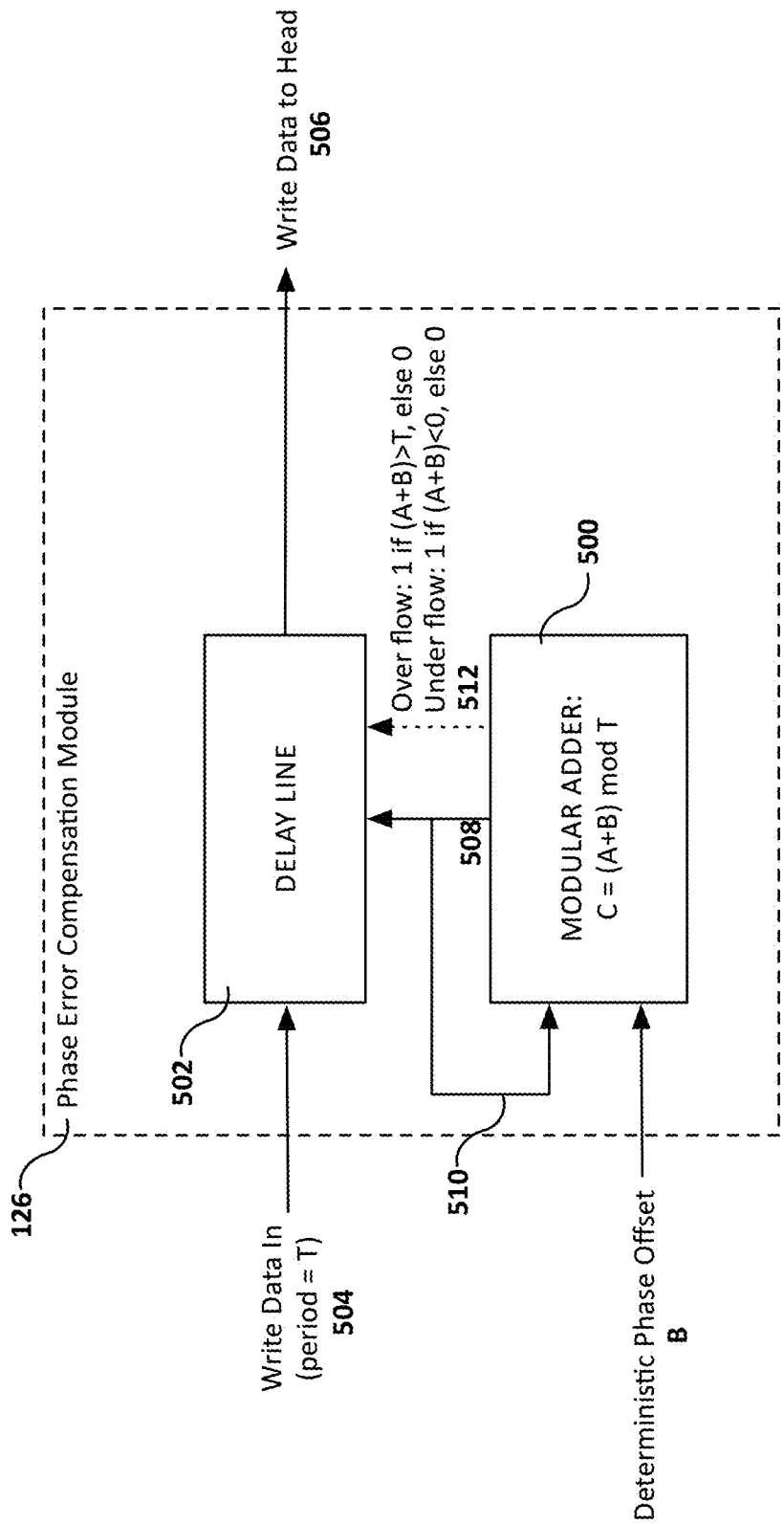
FIG. 5 is a block diagram of a phase error compensation module for write field curvature characterization and compensation, in accordance with certain embodiments of the present disclosure.

FIG. 5 is a block diagram of an example phase error compensation module, such as the phase error compensation module 126, in accordance with certain embodiments of the present disclosure. The phase error compensation module may be configured to introduce a phase compensation to compensate for the write field curvature-induced phase error. In some embodiments, the phase error compensation module may comprise a modular adder 500 and a delay element, such as delay line 502 for periodic patterns such as tones. A signal or write data can be phase advanced or delayed directly at the source via a delay element in the write channel.

For every writing, the modular adder 500 can add (or subtract) the deterministic phase offset B into (or from) the write signal, in accordance with a phase offset pattern characterized by the following mathematical equation:

$$C=(A+B) \bmod T$$

where C is the phase compensation to be applied at track n+1, A is the phase compensation applied at track n, B is the deterministic phase offset, and T is the signal period of the data pattern to be written.

The delay line 502 may receive the write signal 504 and apply a phase error compensation protocol. The phase compensation value 508 applied to the write signal 504 received by the delay line 502 may be calculated by the modular adder 500. In some embodiments, the modular adder 500 may receive the deterministic phase offset B as an input. The modular adder 500 may add (or subtract) the deterministic phase offset B into (or from) the write signal (via the delay line 502). The modular adder 500 calculates the phase compensation value 508 to be applied, e.g., in accordance with C=(A+B) mod T, and transmits the calculated phase compensation value 508 to the delay line 502. The delay line 502 in turn applies the phase compensation value 508 to the write signal 504. In some embodiments, the modular adder 500 may be configured to calculate compensation phase values 508 on-the-fly. In other embodiments, however, the modular adder 500 may calculate the phase compensation value 508 to be applied to every track to which data may be written before a write signal 504 is received at the delay line 502.

In some embodiments, the data pattern to be written may comprise a constant tone pattern, such as the data patterns illustrated in FIG. 4. For instance, in the context of writing user data, the data pattern may comprise a series of bits, each bit representing a zero (0) or a one (1). Because such a data pattern maintains a constant format, a phase roll-over may be implemented as part of the compensation phase delay protocol. The modular adder 500 may be configured to implement the phase roll-over by setting the divisor of the modulo operation at the desired roll-over threshold, such as the signal period of the data pattern to be written (T). For example, the phase-compensation configuration 402 can have the data written to Track 2 offset by deterministic phase offset B relative to the data written to Track 1. Similarly, the data written to Track 3 is offset by deterministic phase offset B relative to the data written to Track 2. The pattern can continue in this manner until the accumulated phase offset is greater than the pattern period. The deterministic phase offset B in this pattern may be one-quarter of the pattern period. Accordingly, the accumulated phase offset at Track 5's writing amounts to a phase offset of a full pattern period. The phase delay applied to the next track's (Track 6's) writing rolls over (or wraps back) such that Track 6 can be written at a phase offset of one-quarter of the pattern period T.

Figure 6:
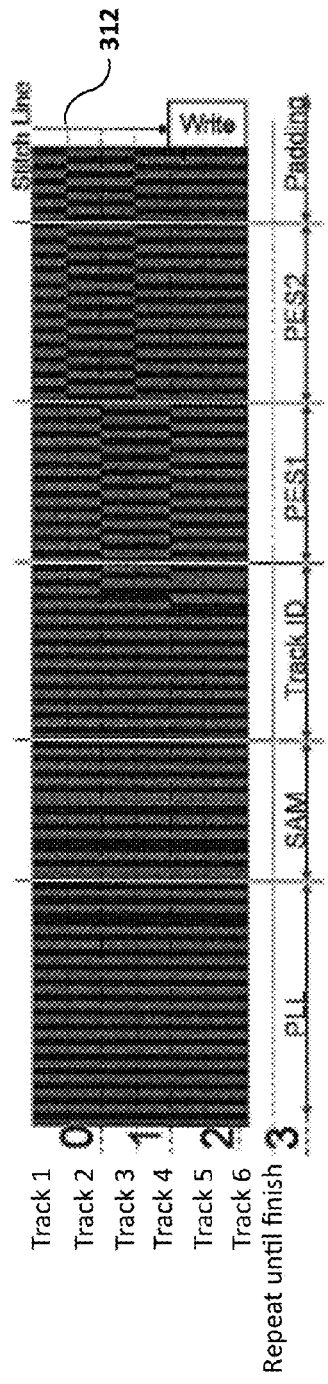
FIG. 6 is a diagram of several adjacent tracks coherently stitched with an implemented phase compensation based on write field curvature characterization, in accordance with certain embodiments of the present disclosure.
Figure 6:
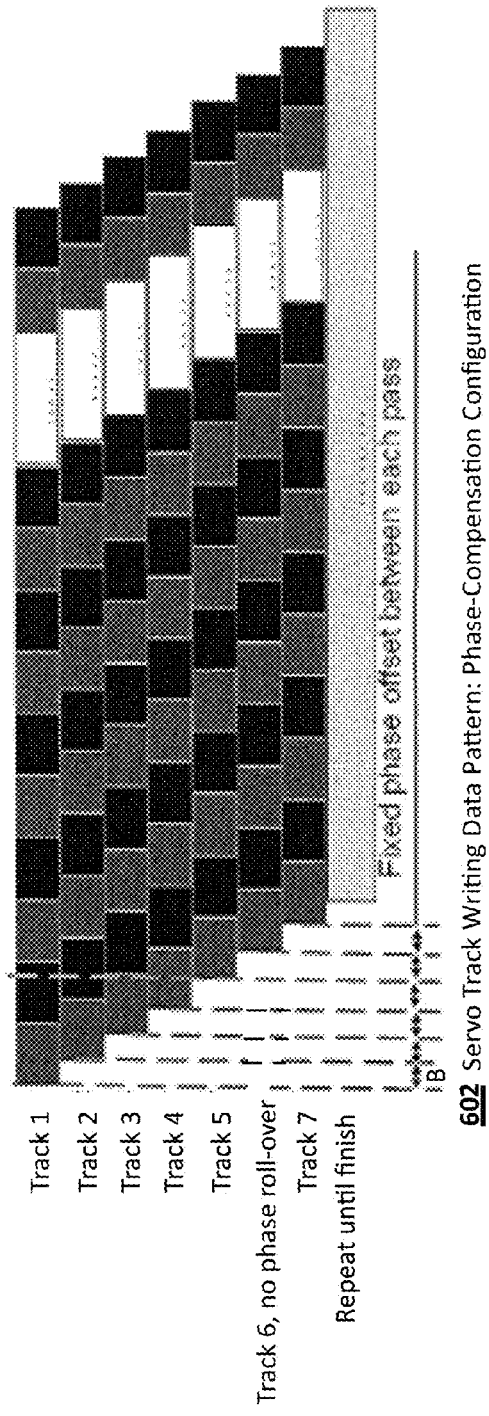

Some embodiments may comprise a data pattern having a non-constant tone. FIG. 6 shows a diagram of several adjacent tracks stitched without (600) and with (602) an implemented compensation phase offset, in accordance with certain embodiments of the present disclosure, and is exemplary of such a data pattern not having a constant tone. Servo track writing (STW), for example, is an application that involves writing data to a data storage medium that includes servo positioning information used to position the transducer with respect to the storage medium and within each data track.

The no-phase-offset configuration 600 of FIG. 6 illustrates an example data pattern written during a STW process. The data pattern can include a phase-locked loop (PLL) field, a servo address mark (SAM) field, a track ID field, a first position error signal (PES1) field, a second position error signal (PES2) field, and padding. Because the data pattern may include a non-constant tone (i.e., the various servo track writing fields may be formatted differently), rolling over the phase delay applied to the servo track writing when the accumulated phase offset is greater than the pattern period may result in a track-to-track servo field type mismatch. For example, if at the writing of Track 6 a phase roll-over were applied, then the Track 6 PLL field will not be adjacent (at the stitch seam) to the Track 5 PLL field. Thus, rather than implementing a compensation phase delay protocol that applies a phase roll-over, the modular adder 500 may be configured to implement a phase error compensation protocol that applies a purely cumulative phase compensation value (no phase roll-over), such as in the phase-compensation configuration 602.

Referring back to FIG. 5, a purely cumulative phase compensation value may be implemented by configuring the modular adder 500 to include an overflow/underflow output signal 512. The overflow/underflow output signal 512 may flag an overflow if the modular adder 500 determines that (A+B)>T. Further, the overflow/underflow output 512 may flag an underflow if the modular adder 500 determines that (A+B)<0. If neither condition holds true, then neither an underflow nor an overflow is flagged.

Figure 7:
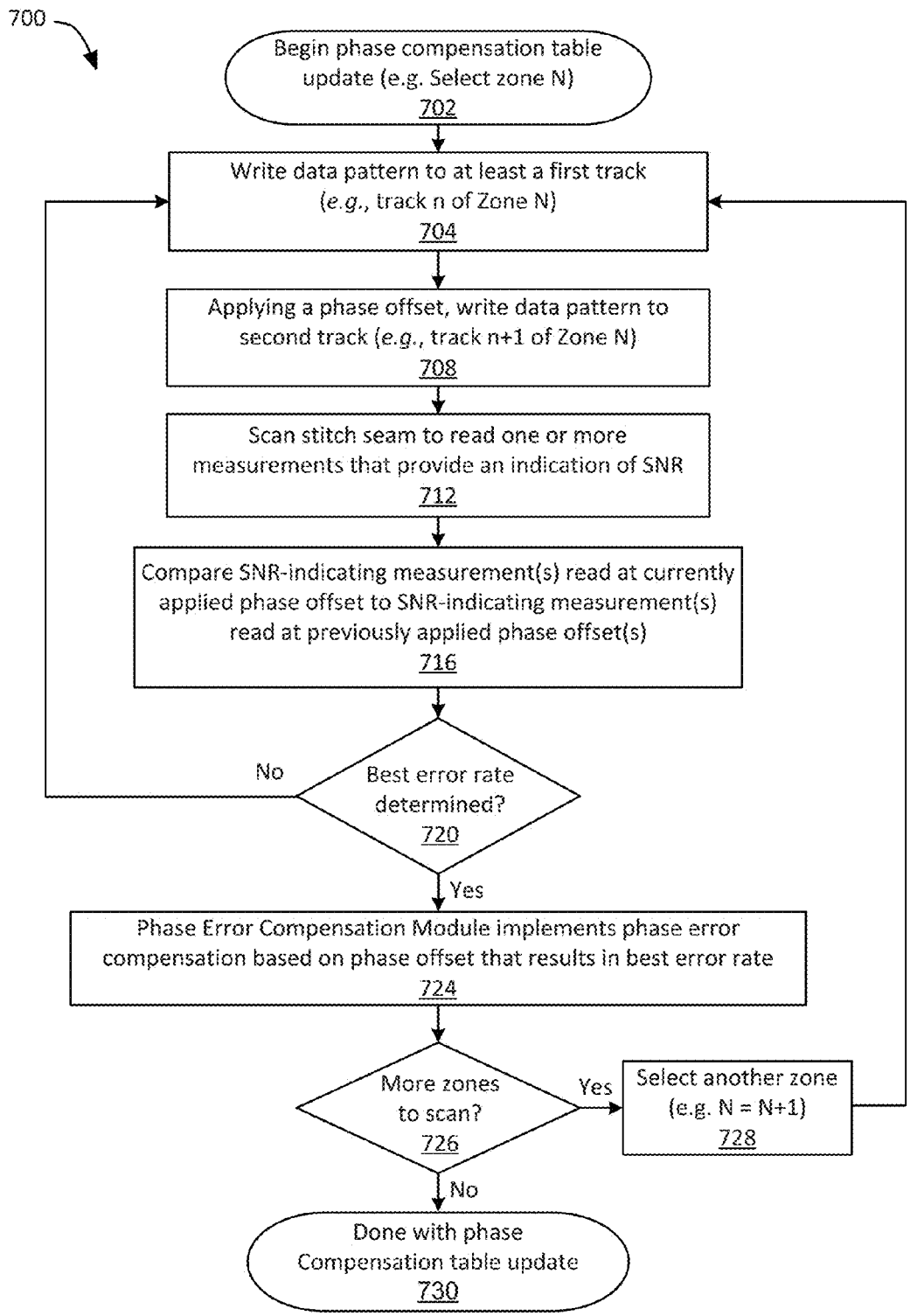
FIG. 7 is a flowchart of a method of write field curvature characterization and compensation, in accordance with certain embodiments of the present disclosure.

FIG. 7 is a flowchart of a method 700 for characterizing the curvature of a transducer write field, in accordance with certain embodiments of the present disclosure. The method may generally involve measuring signal-to-noise ratio(s) (SNR) at stitch seam(s) of adjacent tracks at various phase offsets. A phase offset at the best (e.g. highest) stitch seam SNR can correspond to a physical offset of a write field at the stitch seam.

The method 700 may start, at 702, when a phase compensation table or calculation is to be updated. This may be initialized via trigger such as a command, timer, event occurrence (such as a power cycle event, error detection event, etc.), or any combination thereof. A system implementing the method 700 may choose not to update the table even though a trigger has occurred, such as two triggers occurring within a short time frame or within a single power cycle. Once an update is started, a zone or other location may be chosen and a transducer may write a data pattern to a first selected track of a data storage medium, at 704. Preferably using the same transducer-storage medium combination, a data pattern may also be written to at least a second selected track of the data storage medium at a phase offset relative to the data pattern written to the first selected track, at 708. The first selected track (e.g. "track n" of "Zone N") and the second selected track (e.g. "track n+1" of "Zone N") may be stitched together along a stitch seam, such as in FIG. 3.

The method 700 may then scan the stitch seam to read one or more measurements that provide an indication of signal-to-noise ratio (SNR) at the stitch seams, at 712. Then, the SNR-indicating measurement(s) read from the stitch seam, which should be at the currently applied phase offset, can be compared to SNR-indicating stitch seam measurement(s) corresponding to previously applied phase offsets, if any, at 716.

In some embodiments, the one or more measurements that correspond to the SNR may be compared to determine which, among the various applied phase offsets, corresponds to the "best" (or most favorable) measurement. In the context of measured SNR, the best SNR may be the highest SNR measurement. In the context of measured error rates, the best measurement may be the lowest measured error rate.

If, at 720, it is determined that the best error rate has been determined, then the method 700 may select a phase offset corresponding to the best error rate measurement as the deterministic phase offset to be used as the basis for compensating for phase error caused by write field curvature, at 724. The phase error compensation module (such as module 126 shown in FIG. 2) may implement the phase error compensation, at 724.

If, however, at 720, it is determined that the best error rate has not been determined, then the method 700 may retry writing a data pattern, at 704 and 708, so that another SNR can be calculated, at 712 and 716, and another phase offset may be selected, at 724. In this manner, various phase offsets may be applied to data patterns written to adjacent tracks until the best error rate, and thus the deterministic phase offset, are determined.

The method 700 may determine whether there are more zones or areas of the data storage medium that need to be scanned, that is a phase compensation needs to be updated for the corresponding area or zone, at 726. A device implementing the method 700 may choose to update all zones in a table when any zone is updated, or may choose other triggers as to whether a zone's corresponding phase compensation needs updating, such as when an error rate of a selected zone is higher than a threshold error rate. If another zone is to be updated, the method 700 may then select the another zone, at 728, and repeat the method 700 for the selected another zone. Once all zones that need updating are updated, the method 700 may end, at 730.

Figure 8:
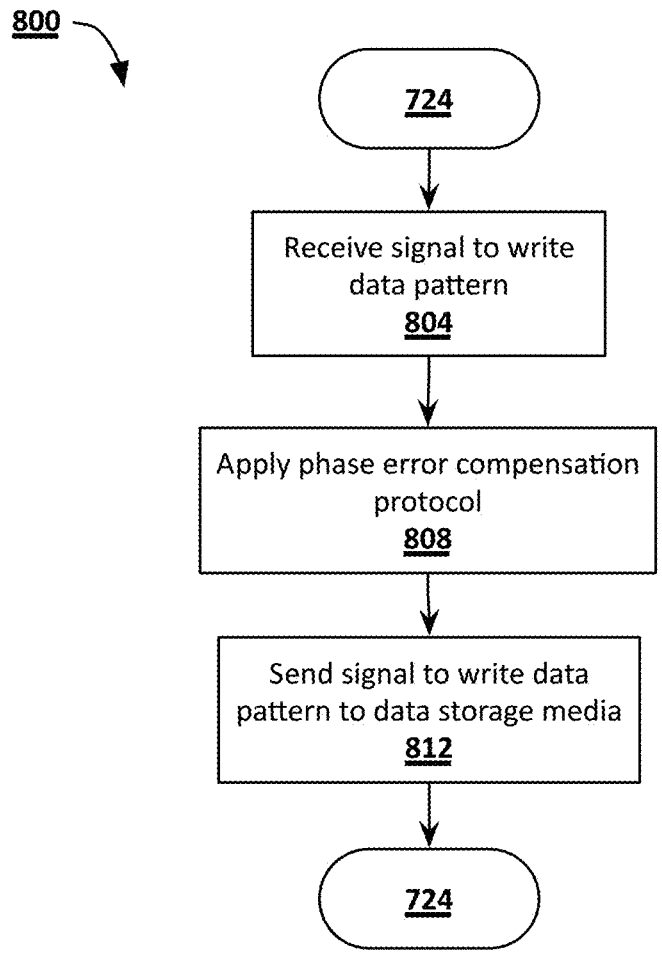
FIG. 8 is a flowchart of a method implementing compensations based on write field curvature characterization, in accordance with certain embodiments of the present disclosure.

FIG. 8 is a flowchart of a method 800 for compensating for the phase error caused by the curvature of a write field, in accordance with certain embodiments of the present disclosure. The method 800 is an example of the functions and steps that can occur when implementing phase error compensation, such as at 724 of FIG. 7.

The phase error compensation module 126 may receive a signal to write a data pattern, at 804. The delay line 502 may receive the write signal 504 and apply a phase error compensation protocol, at 808. The resulting phase compensated write signal 506 may be transmitted to the transducer (e.g., recording head 106) such that the transducer may write the data pattern to the data storage medium, at 812. The data signal can be phase advanced or delayed in the channel also. A delay line is an example of how such a delay can be implemented.

Figure 9:
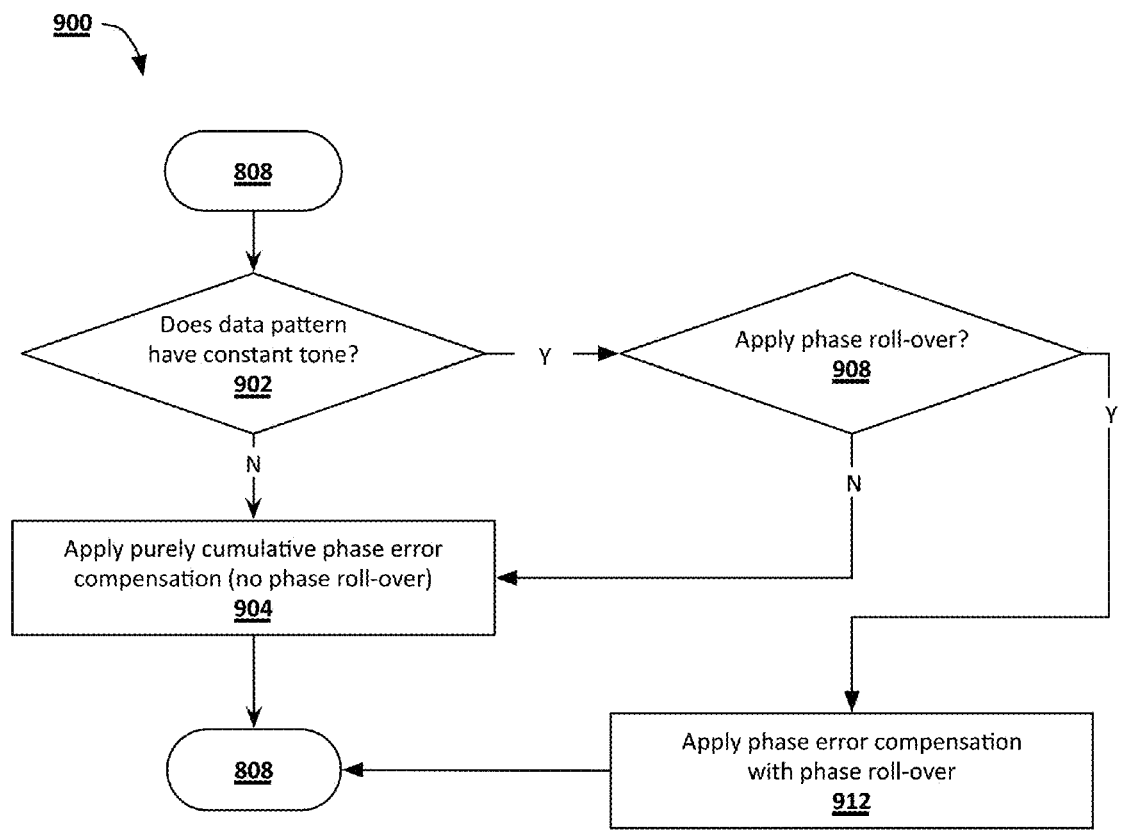
FIG. 9 is a flowchart of a method of determining a phase error compensation protocol, in accordance with certain embodiments of the present disclosure.

FIG. 9 is a flowchart of a method 900 for determining a phase error compensation protocol, in accordance with certain embodiments of the present disclosure. The method 900 is an example of the functions and steps that can occur when applying a phase error compensation protocol, such as at 808 of FIG. 8. The method 900 can include a phase error compensation module determining whether a data pattern to be written comprises a constant tone, at 902. If the data pattern is a constant tone, then the phase error compensation module may determine whether to apply a phase compensation value that factors in a phase roll-over, at 908. If a phase compensation module with phase-roll-over is applied, the phase error compensation module may apply the phase compensation value that factors in a phase roll-over, at 912.

If, however, the data pattern has a non-constant tone or the phase error compensation module determines not to apply a phase roll-over, then the phase error compensation module may apply a purely cumulative phase compensation value (i.e. no phase roll-over), at 904.

Figure 10B:
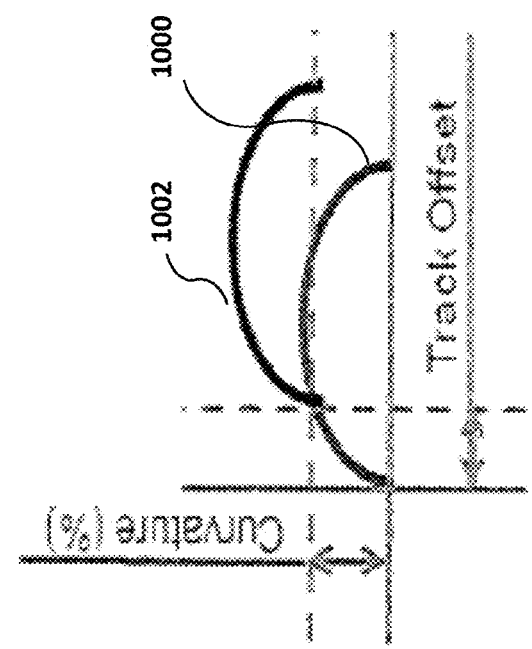
FIG. 10B is a plot illustrating the positioning of two tracks with a phase offset applied, in accordance with certain embodiments of the present disclosure.
Figure 10A:
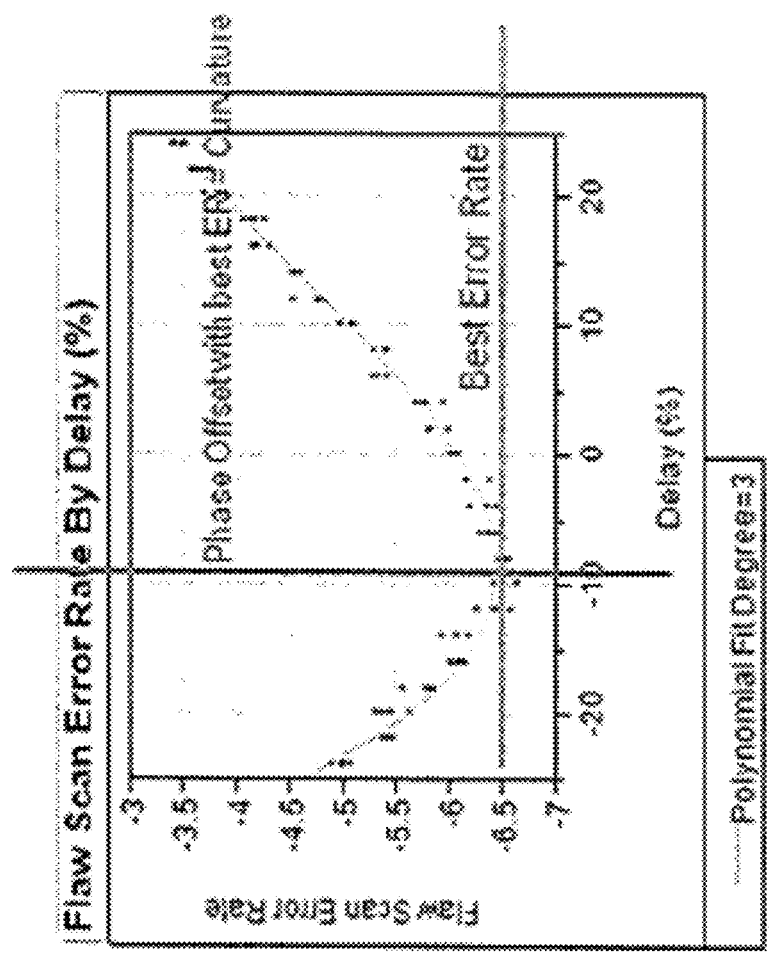
FIG. 10A is a plot illustrating error rates at various applied phase offsets, in accordance with certain embodiments of the present disclosure.
Figure 11:
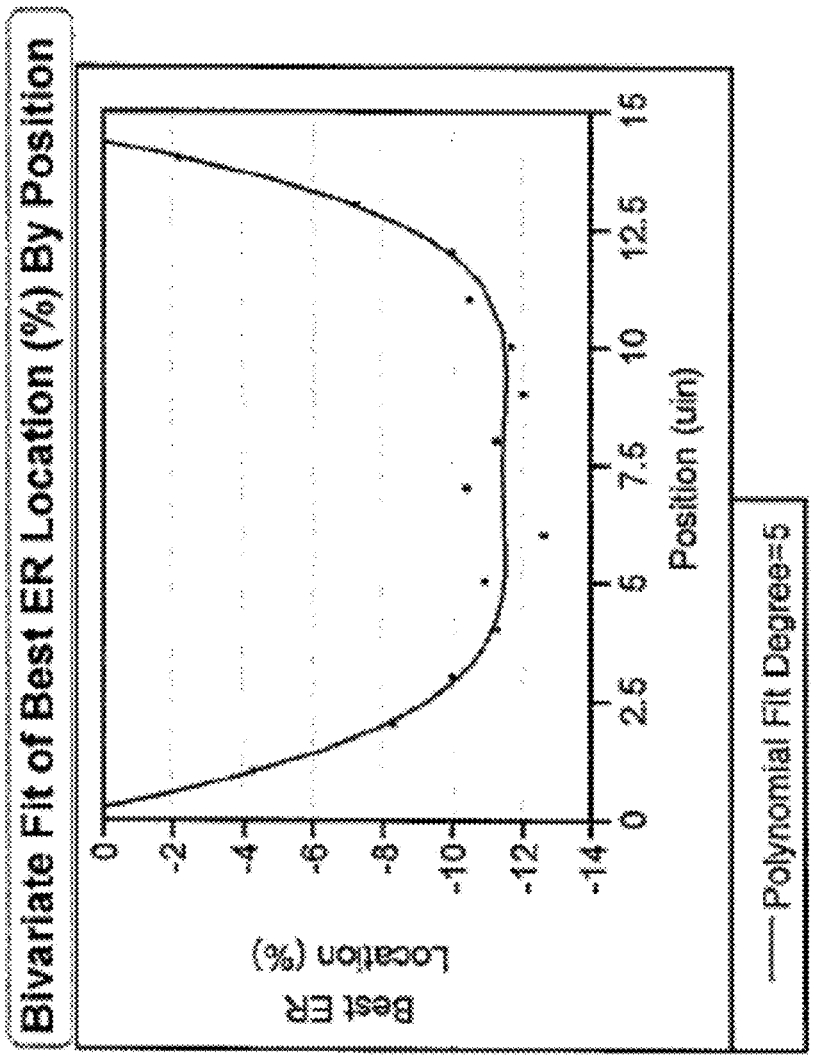
FIG. 11 is a plot illustrating a measured write field curvature profile, in accordance with certain embodiments of the present disclosure.

FIGS. 10A-11 provide plots illustrating using measured error rates to characterize write field curvature, in accordance with certain embodiments of the present disclosure. In some embodiments, a media flaw scan process may be conducted to measure error rates at the stitch seams.

FIG. 10A is a plot illustrating measured error rates versus applied phase offset in percentage of the pattern period, in accordance with certain embodiments of the present disclosure. A negative delay, or an advancement, indicates the second track may be shifted in the up-track direction relative the first track. The error rates measured at the stitch seam at the various applied phase offsets serve as a measure of signal-to-noise ratio (SNR) because the curvature increases the noise at the stitch seam and can be detected as a false defect during a media flaw scan. Thus, the lower error rates indicate improved SNR. The plot of FIG. 10A fits the measured error rates with a polynomial of degree 3 to find the minimum of the curve, and thus the phase offset at which the best error rate can be measured. In some embodiments, this phase offset corresponding to the best error rate may be selected as the deterministic phase offset used by the phase error compensation module 126.

FIG. 10B is a plot illustrating the positioning of two tracks (first track 1000 and second track 1002) with a phase offset applied, in accordance with certain embodiments of the present disclosure. The horizontal axis corresponds to the location of the tracks 1000 and 1002 on the media, where the segment identified by the arrows (between the vertical dotted and solid lines) indicates the distance between a first track 1000 and a second track 1002 (track stitching distance). The vertical axis corresponds to the up-track/down-track direction on the media indicating the phase offset measured in curvature percentage. The positive vertical direction in FIG. 10B corresponds to the up-track direction and thus a negative phase offset, or a phase advancement, in FIG. 10A. The distance identified by the vertical arrows (between the dotted and solid horizontal lines) corresponds to the optimal phase offset as measured by the curve distance relative to the edge of the head field. The curves illustrate the position of bits written to adjacent tracks, where the second track 1002 is shifted in the up-track direction relative to the first track 1000 to maximize the SNR.

FIG. 11 is a plot illustrating a write field curvature profile, measured in accordance with certain embodiments of the present disclosure. In order to generate the write field curvature profile for a particular transducer-media combination, the stitch seam between the first track 1000 and the second track 1002 (FIG. 10B) can be scanned for best error rate at various track stitching distances. With the relative offset between the two tracks 1000 and 1002 being the deterministic phase offset B, the track stitching distance can be varied such that at the first run, there is maximal overlap between the two tracks 1000 and 1002 and at the last run there may be minimal overlap between the two tracks 1000 and 1002. FIG. 11 shows the result of a run of scans for a particular transducer-media combination. The vertical axis corresponds to the measured error rate, where lower values indicate better SNR, and the horizontal axis corresponds to the varying track-stitching distances in micro inches. To find the write field curvature profile, a polynomial of degree 5 can be fit to the measured error rates.

In accordance with various embodiments, the methods described herein may be implemented as one or more software programs running on a computer processor or controller, such as the controller 212. In accordance with another embodiment, the methods described herein may be implemented as one or more software programs running on a computing device, such as a disc drive. Dedicated hardware implementations including, but not limited to, application specific integrated circuits, programmable logic arrays, and other hardware devices can likewise be constructed to implement the methods described herein. Further, the methods described herein may be implemented as a computer readable medium including instructions that when executed cause a processor to perform the methods.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
  a circuit configured to apply a phase compensation value to a write signal when writing data to a data track, the circuit comprising a modular adder circuit that has an input to receive the phase compensation value, the modular adder coupled to a delay line circuit with an output that is configured to provide the write signal prior to storing the write signal on a data storage medium.

2. The apparatus of claim 1, further comprising the circuit configured to determine the phase compensation value based on a characterization of curvature in a write field generated by a transducer.

3. The apparatus of claim 2, wherein the characterization of curvature in the write field includes a deterministic phase offset value based on a data pattern incoherency between adjacent data tracks, the data pattern incoherency induced at least in part by the curvature in the write field.

4. The apparatus of claim 3, further comprising the circuit configured to determine the deterministic phase offset value corresponding to a selected measurement based on a comparison of one or more signal-to-noise ratio (SNR) indicating measurements read from one or more stitch seams between adjacent data tracks, the one or more SNR indicating measurements read by scanning the one or more stitch seams of one or more data patterns written to adjacent data tracks at one or more applied phase offset values.

5. The apparatus of claim 4, further comprising the circuit configured to determine the selected measurement based on a lowest error rate measured.

6. The apparatus of claim 4, further comprising the circuit configured to determine the selected measurement based on a highest SNR measured.

7. The apparatus of claim 1, further comprising the circuit configured to determine the characterization of curvature in the write field by scanning multiple sets of adjacent data tracks.

8. The apparatus of claim 1, further comprising the circuit configured to:
  determine the characterization of curvature in the write field by scanning multiple sets of adjacent data tracks at different radial locations; and
  store the phase compensation value as a polynomial value across a number of tracks.

9. A method comprising:
  determining one or more measurements that provide an indication of a signal-to-noise ratio that corresponds to incoherency between first data written to a first data track and second data written to a second data track that is immediately adjacent the first data track;
  determining a phase compensation value based on the indication of the signal-to-noise ratio, including:
    determining whether a data pattern to be written includes a constant tone;
    when the data pattern includes a constant tone, then selectively apply a phase compensation value that includes a phase roll-over;
    when the data pattern does not include a constant tone, then apply a phase compensation value that includes a cumulative phase offset; and
  applying the phase compensation value to a write signal to write data to a data track relative to data written to an immediately adjacent track.

10. The method of claim 9 wherein the applied phase compensation value minimizes an incoherency of the data written to the data track relative to data written to the immediately adjacent track.

11. The method of claim 9 wherein the applied phase compensation value shifts the data written to the data track relative to data written to the immediately adjacent track.

12. The method of claim 9 wherein the determining the indication includes measuring the signal-to-noise ratio at a seam between the first and second data tracks.

13. A method comprising:
  (a) determining an error rate associated with incoherency between first data written to a first track and second data written to a second track that is immediately adjacent the first track, the second data written at a phase offset relative to the first data written to the first track;
  (b) repeating step (a) for at least another phase offset;
  (c) determining a lowest error rate of the measured error rates;
  (d) selecting a phase offset that corresponds to the lowest error rate, including:
    (i) determining whether a data pattern to be written includes a constant tone;
    (ii) when the data pattern includes a constant tone, then selectively apply a phase compensation value that factors in a phase roll-over;
    (iii) when the data pattern does not include a constant tone, then apply a phase compensation value that includes a cumulative phase offset; and
  (e) using the selected phase offset to write data to a one of an immediately adjacent track pair.

14. The method of claim 13 further comprising:
writing first data to the first track;
writing second data to the second track that is immediately adjacent the first track.

15. The method of claim 13 wherein the used selected phase offset minimizes an incoherency of data written to the immediately adjacent track pair.

16. The method of claim 13 wherein the used selected phase offset shifts data written to the immediately adjacent track pair.

17. The method of claim 13 wherein the determining the lowest bit error rate includes measuring the bit error rates at a seam between the first and second tracks.

18. The method of claim 17 further comprises varying a width of the seam while maintaining the selected phase offset between the first track and the second track, the width of the seam varied within a range of positions from substantially full overlap between the data tracks to substantially no overlap between the data tracks.

* * * * *